United States Patent
Petersen et al.

(10) Patent No.: US 9,517,886 B2
(45) Date of Patent: Dec. 13, 2016

(54) CLEATED CONVEYOR BELT

(71) Applicant: UNVERFERTH MANUFACTURING COMPANY, INC., Kalida, OH (US)

(72) Inventors: Brian James Petersen, Ottawa, OH (US); Shawn W. Gerdeman, Delphos, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 14/798,939

(22) Filed: Jul. 14, 2015

(65) Prior Publication Data

US 2016/0031650 A1    Feb. 4, 2016

Related U.S. Application Data

(60) Provisional application No. 62/031,458, filed on Jul. 31, 2014.

(51) Int. Cl.
*B65G 15/42* (2006.01)
*B65G 15/08* (2006.01)
*B65G 15/30* (2006.01)

(52) U.S. Cl.
CPC ............... *B65G 15/42* (2013.01); *B65G 15/08* (2013.01); *B65G 2201/042* (2013.01); *B65G 2201/045* (2013.01)

(58) Field of Classification Search
None
See application file for complete search history.

(56) References Cited

U.S. PATENT DOCUMENTS

| | | | | |
|---|---|---|---|---|
| 2,909,271 A * | 10/1959 | Taylor | ............... | B65G 15/42 198/690.2 |
| 3,365,049 A * | 1/1968 | Raab | ............... | B65G 47/00 198/550.13 |
| 4,060,167 A * | 11/1977 | Smith | ............... | B65G 47/19 198/622 |
| 6,170,646 B1 | 1/2001 | Kaeb et al. | | |
| 7,000,758 B2 * | 2/2006 | Bjorklund | ............... | B65G 15/08 198/716 |
| 8,292,065 B1 | 10/2012 | Neufeld et al. | | |
| 2010/0326798 A1* | 12/2010 | Friesen | ............... | B65G 15/08 198/823 |
| 2013/0168209 A1 | 7/2013 | Fanshier et al. | | |

* cited by examiner

*Primary Examiner* — Kavel Singh
(74) *Attorney, Agent, or Firm* — Rothwell, Figg, Ernst & Manbeck, P.C.

(57) ABSTRACT

A belt includes one or more devices that prevent roll-back of material being conveyed by the belt wherein the one or more devices are formed as a pattern on the belt. The pattern includes one of the one or more devices being offset from at least another of the one or more devices. The pattern is at distance from another pattern of the one or more devices formed on the belt.

14 Claims, 11 Drawing Sheets

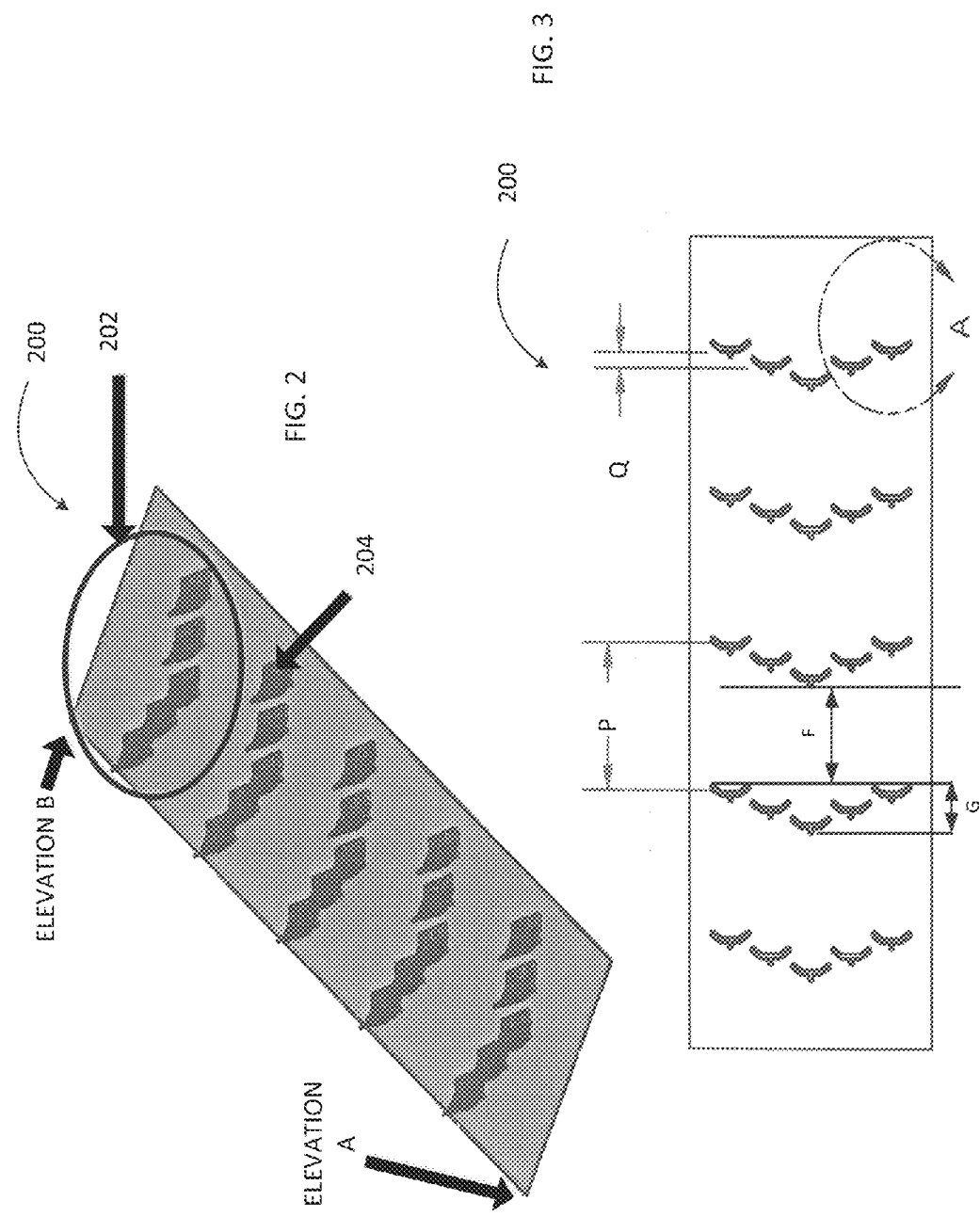

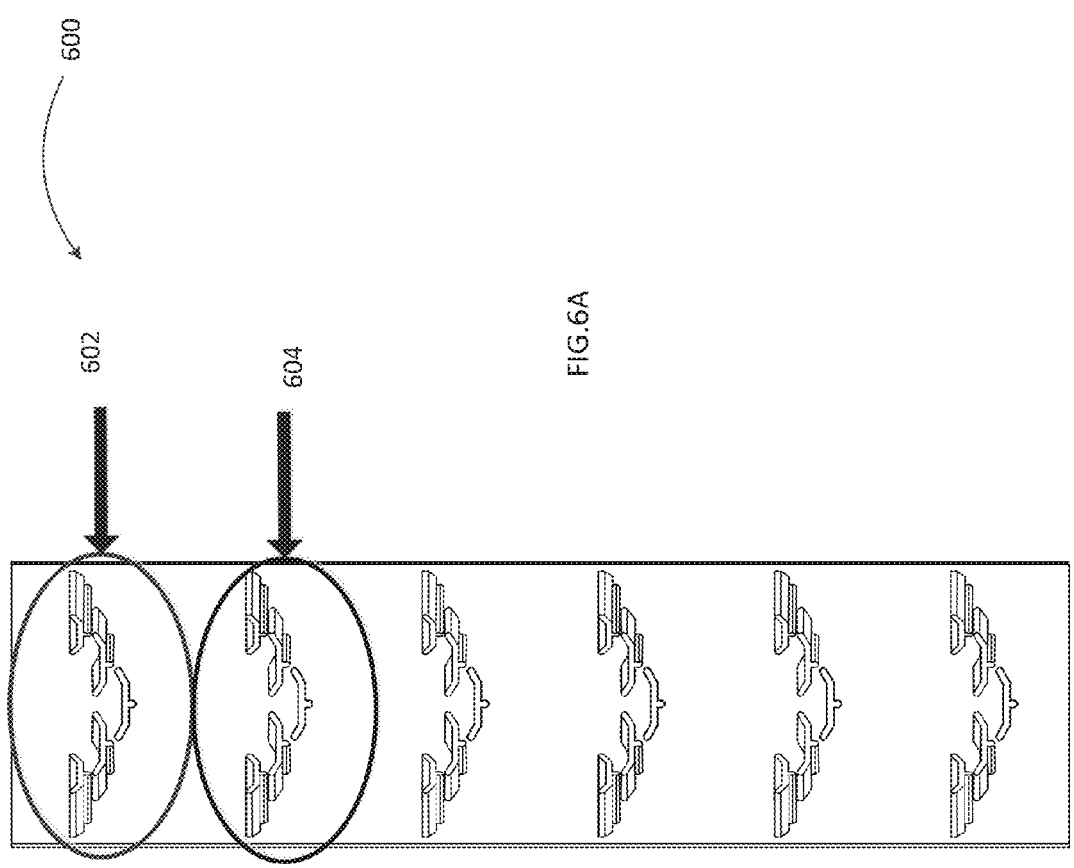

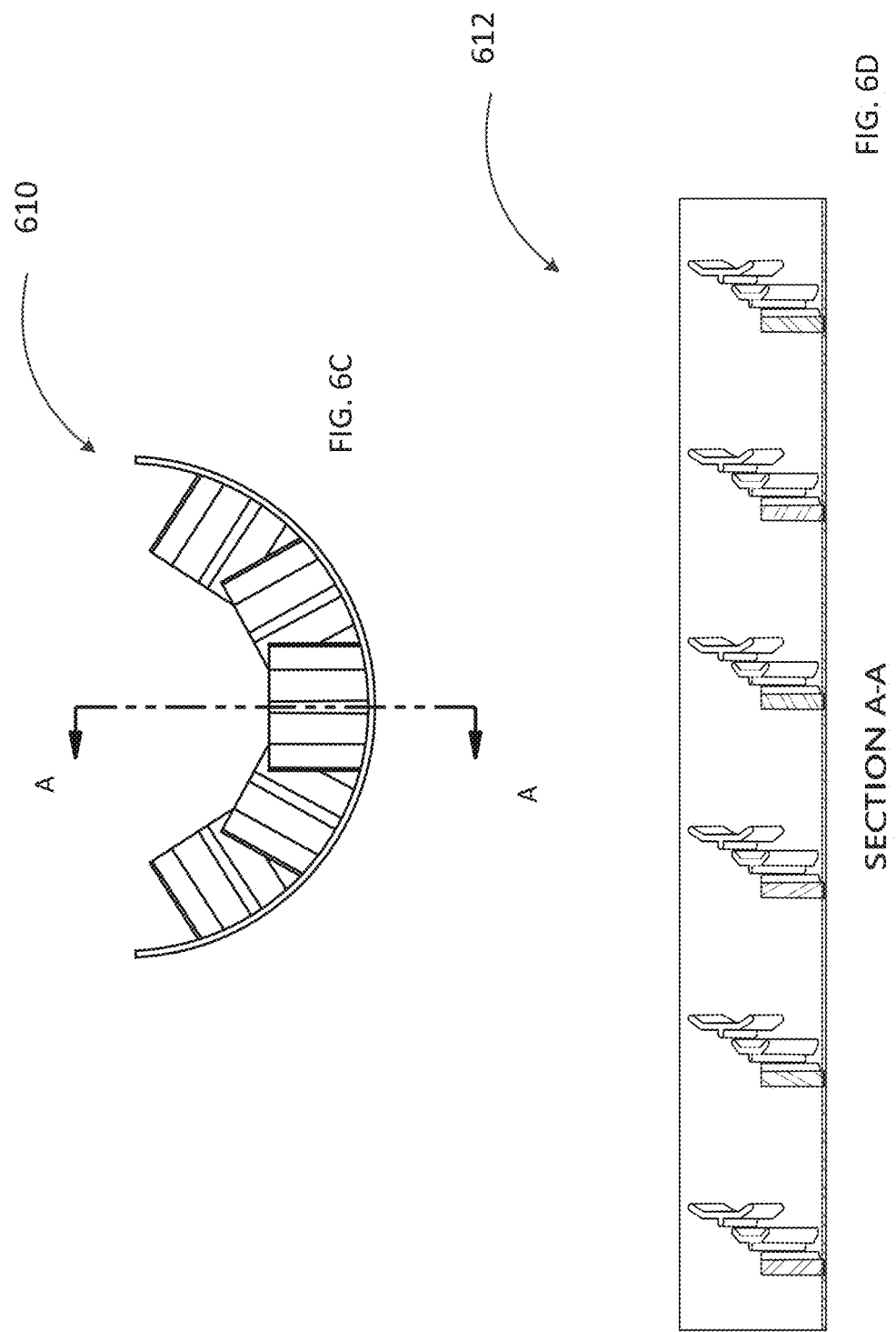

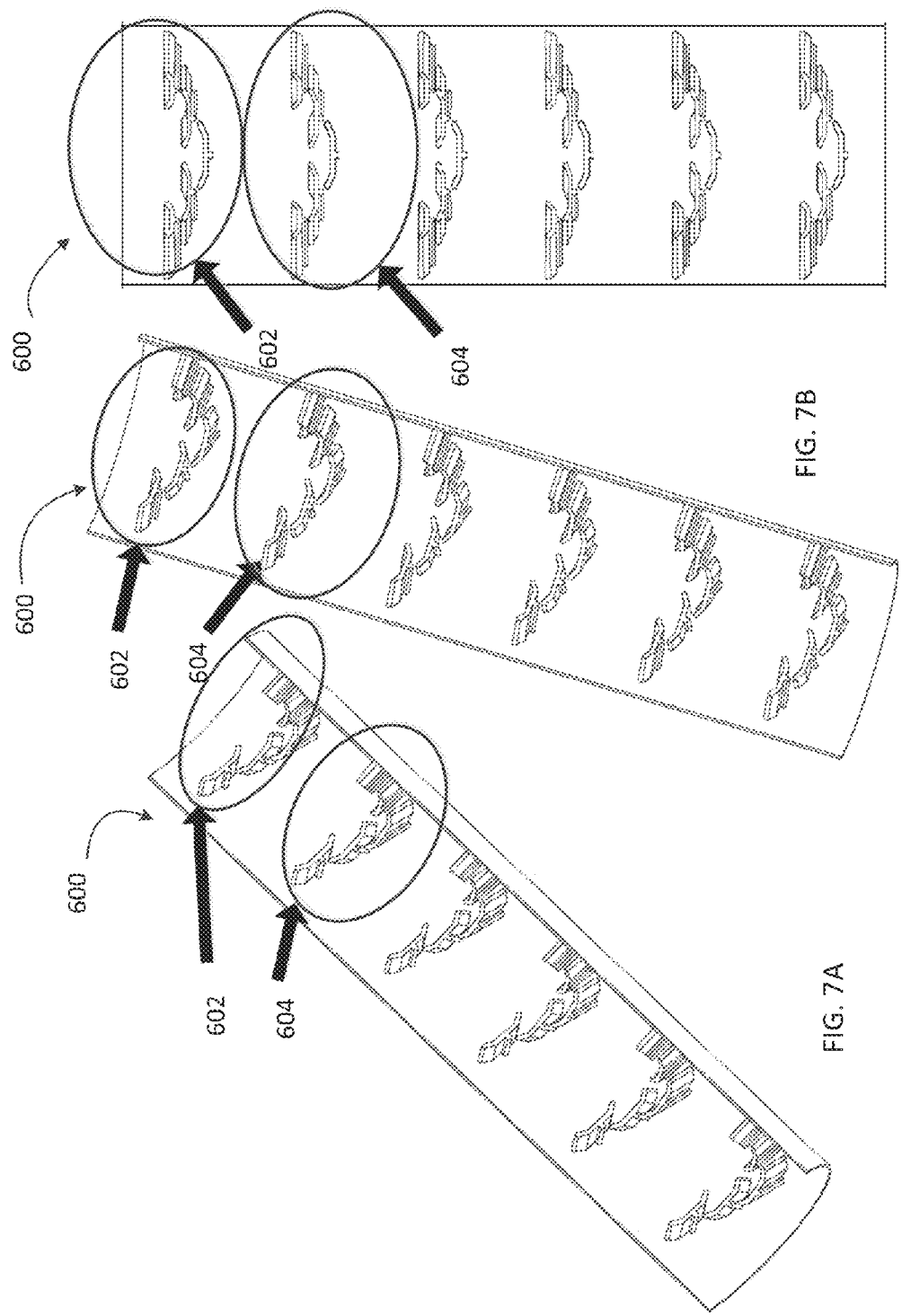

CLEATED CONVEYOR BELT

CROSS-REFERENCE TO RELATED APPLICATIONS

The present application claims priority to U.S. Provisional Application No. 62/031,458, filed Jul. 31, 2014, the entire disclosure of which is incorporated herein by reference.

BACKGROUND OF THE INVENTION

Field of the Invention

The present invention relates to the field of material conveyers.

Description of the Background Art

Conveyers are used in a variety of different applications to handle and move different types of products and/or materials. For example, conveyers are used in the agriculture industry to move grain products (e.g., wheat, rice, etc.) and/or can be used in the other industries, such as in mineral extractions (e.g., diamonds, coal, etc.) industries, and manufacturing processes.

In the agriculture industry, for example, grain production has resulted in equipment causing conveyers to increase in size. As such, the increased size of the conveyer requires the carrying capacity of the conveyer to be configured to take into consideration the greater amounts of grain production.

The conveyer may include a belt conveyer, or also known as a belt. The configuration of the belt may be a continuous belt that can start out flat at an intake portion of the conveyer and then forms into a tubular shape to receive product (e.g., grains, minerals, etc.), and then flattens out again at the discharge end of the conveyer. The conveyer may be operated at an upward incline which may results in the product rolling back downwards against the direction of the movement of the belt. Thus, the configuration of the belt may require features to prevent the roll-back of the material being transported by the conveyer.

SUMMARY OF THE INVENTION

In accordance with aspects of the invention, a belt comprises one or more devices that prevent roll-back of material being conveyed by the belt. The one or more devices are formed as a pattern on the belt. The pattern includes one of the one or more devices being offset from at least another of the one or more devices. The pattern is at a distance from another pattern of the one or more devices formed on the belt.

BRIEF DESCRIPTION OF DRAWINGS

FIG. 2 is an example perspective view of a conveyer belt in accordance with aspects of the present invention;

FIG. 3 is an example plan view of a conveyer belt in accordance with aspects of the present invention;

FIGS. 6A-6D are example views of a conveyer belt in accordance with aspects of the present invention; and FIGS. 7A-7C are example perspective view of a conveyer belt in accordance with aspects of the present invention.

DETAILED DESCRIPTION

Apparatus and methods described herein may create a belt configuration that conveys material so as to prevent roll-back of the material. In embodiments, the present invention provides for an improved configuration of a belt so as to prevent the roll-back of materials/products being conveyed by a conveyer system. The improved configuration may include a cleat configuration which can include a series of individual vertical and/or horizontal cleats arranged in a particular pattern that can be perpendicular to the travel direction of the belt. In embodiments, each cleat may be considered as a device that protrudes/projects from the surface of the belt. In embodiments, each individual cleat within the improved cleat configuration may also have a unique shape that further prevents the roll-back of materials/products being conveyed by a conveyer system. Furthermore, the cleats may be arranged in multiple arrays of a particular configuration on the belt so that there is an additional reduction in the roll-back of material/products being conveyed by the conveyer.

As a result, the arrangement of the cleats across the belt assists in carrying the material forward as well as ensuring that the belt can trough into a tubular shape without the cleats intersecting each other. Thus, the conveyed material does not get pinched between the cleats while allowing the cleats to form a continuous and/or nearly continuous seal that prevents the material from rolling back down the tubular shaped belt. Additionally, the non-intersecting features of the belt configuration results in: (i) requiring less power input into the conveyer to pull the tubular shaped belt to carry the material; (ii) increasing the contact between the belt and one or more drive rollers of the conveyer; (iii) reducing the size of the rollers in the conveyer and as a result reducing costs; and (iv) improving belt tracking alignment. As such, the configuration of cleats on a belt utilizes a unique and novel cleat configuration which provides a belt capable of high angle material moving capabilities.

While the examples below provide descriptions of detailed embodiments, the invention is not intended to be limited in scope of interpretation to any particular embodiment. Rather, the examples are non-limiting and other embodiments within the scope of the invention may be implemented. Furthermore, while the term "cleat" may be used to describe different features of a belt, other terms may be used, such as "lugs," "protrusions," "paddles," "stubs," etc. Additionally, or alternatively, while the belt may be part of a conveyer or conveyer system that is associated with the movement of materials from a lower elevation to a higher elevation, the examples may also be associated with the movement of materials from a higher elevation to a lower elevation and/or the movement of materials across the same elevation.

Figure 1:
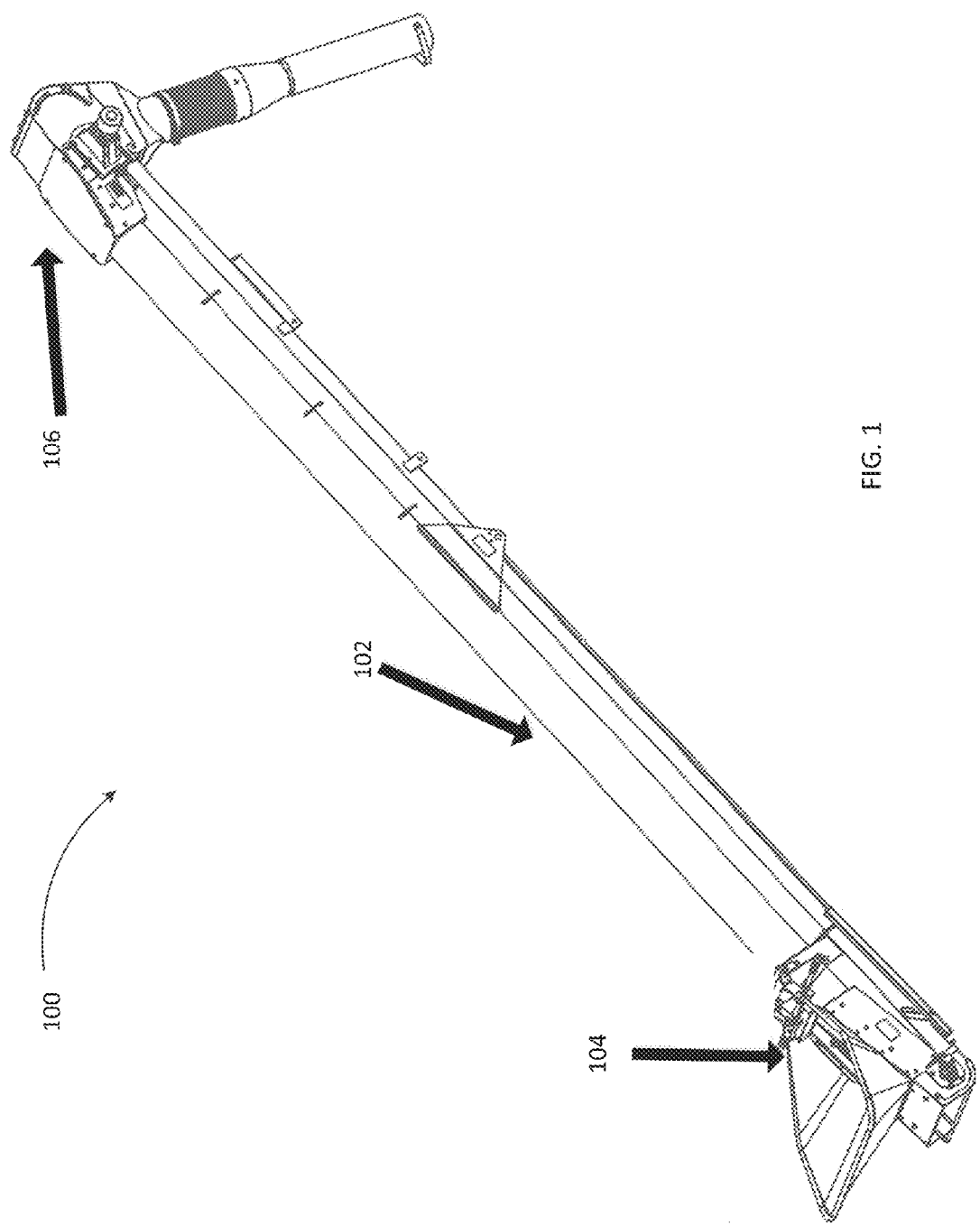
FIG. 1 is an example view of conveyer in accordance with aspects of the present invention.

FIG. 1 is an example view of conveyer 100 in accordance with aspects of the present invention. As shown in FIG. 1, conveyer 100 includes housing 102, a conveyer intake 104, and a conveyer discharge 106. In embodiments, conveyer 100 may be used to convey materials (e.g., grains) taken into conveyer discharge 104 and then moved in a direction towards conveyer discharge 106. In embodiments, housing 102 includes a belt, as further described in FIGS. 2-5, 6A-6D, and/or 7A-7C, that is driven by a conveyer drive that may be powered by one or more power units.

In embodiments, housing 102 may be of tubular shape, rectangular shape, square tubes, and/or any other type of shape. Alternatively, housing 102 may be configured as an open carrier. As such, housing 102 provides confinement of the conveyed materials as well as a guard for safety to the conveyed materials.

FIG. 2 is an example perspective view of a belt 200 in accordance with aspects of the present invention. In embodiments, belt 200 can travel within a conveyer, such as conveyer 100 and housing 102, from a lower elevation level A to a higher elevation level B. Alternatively, belt 200 can travel in conveyer 100 from the higher elevation B to lower elevation A.

As shown in FIG. 2, belt 200 includes a cleat configuration 202 that includes multiple cleats 204 that are offset to each other. In embodiments, cleats 204 may be made of one or more materials, such as rubber, plastic, metal, and/or hybrid materials that include multiple materials. In embodiments, cleats 204 can be integrally attached to belt 200 by either being molded into belt 200 and/or being attached by other methods, such as being bonded to the belt by using other materials or processes (e.g., welding, soldering, etc.). In further embodiments, each of cleats 204 may be individually attached to belt 200 or may be attached as a group in any particular shape.

FIG. 3 is an example plan view of belt 200 in accordance with aspects of the present invention. As shown in FIG. 3, cleats 204 are arranged in unique cleat configurations, such as cleat configuration 202, which results in a staggering effect of each cleat 204 within cleat configuration 202 (e.g., each cleat 204 is offset to another cleat 204 within the same cleat configuration 202) and, thus, prevents roll-back of material that is being conveyed on belt 200 within a conveyer system, such as conveyer 100. In embodiments, cleat configuration 202 can be arranged in a pattern that could be considered as a "U" shape, a trough shape, or as a curve such as generated by a quadratic equation (e.g., $y=x^2+bx+c$, with b and c as integers). As a result of the shape of the pattern of cleat configuration 202, which is perpendicular to the travel direction of the belt, material does not roll-back from elevation point A to B as shown in FIG. 2.

Further, as shown in FIG. 3, one cleat configuration 202 is configured at a distance "P" from another cleat configuration 202. For example, each cleat 204 within each cleat configuration 202 is positioned "P" distance (e.g., within a range of about 3-8 inches, such as about 6 inches) from another cleat 204 within another cleat configuration 202. As such, both cleats 204 at a distance "P" are in the same position with each cleat configuration 202. Thus, the two cleats 204 may be parallel to each other that are at a distance "P." Thus, each configuration of each cleat configuration 202 may be the same and a uniform distance is created between parallel cleats 204 in different cleat configurations 202. As shown in FIG. 3, the distance "Q" is the distance between two cleats 204 within the same cleat configuration 202. Distance "Q" may range from about ½ to 1 inches, e.g., about 0.65 inches. Portion "A" as shown in FIG. 3 is further described in FIG. 5 as portion 500.

There can be any suitable number of cleats in cleat configuration 202. In certain embodiments, these can be an even or odd number of cleats in a cleat configuration 202, or alternating even and odd number of cleats. In certain embodiments, there are an odd number of cleats in each cleat configuration 202, such as about 3-11 cleats per cleat configuration 202, e.g., about 5 cleats per cleat configuration 202.

Also, as shown in FIG. 3, distance "F" is the distance between the ends of the last cleat(s) 204 in one cleat configuration 202 and a tip of a first cleat 204 in another cleat configuration 202 of offset cleats. As such, the distance "F" may be the minimum distance between two cleat configurations 202. Distance "F" may range from about 1-5 inches, e.g., about 3.65 inches. Also, as shown in FIG. 3, the distance "G" is the maximum distance between two cleats 204 within the same cleat configuration 202. Thus, the distance "G" is the distance between the tip of a first cleat 204 and the ends of a last cleat 204 within the same cleat configuration 202. As such, the distance "G" may be the footprint (e.g., length) of a cleat configuration 202. Distance "G" may range from about 2-3 inches, e.g., about 2.35 inches.

In embodiments, the distance "F" may be at least about 50% of the distance "G." In additional embodiments, the distance "F" may be at least about equal to the distance "G." In further embodiments, the distance "F" may be at least about equal to 150% of the distance "G."

Figure 4:
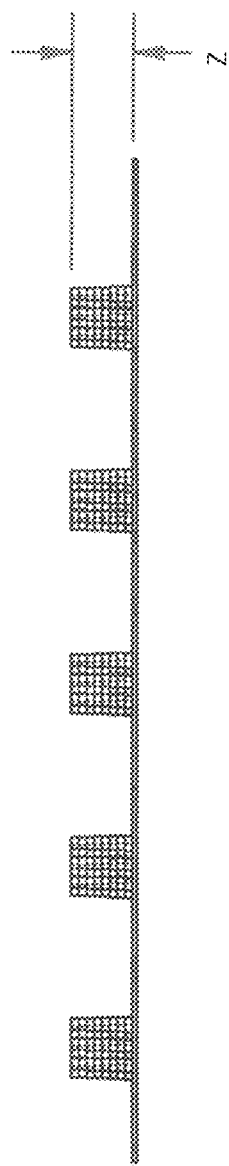
FIG. 4 is an example transverse view of a conveyer belt in accordance with aspects of the present invention.

FIG. 4 is an example transverse view of belt 200 in accordance with aspects of the present invention. As shown in FIG. 4, cleat 204 may protrude/project from a belt surface 402 of belt 200 at a particular distance "Z." For example, the distance may be 1-3 inches, e.g., about 2 inches, such that cleats 204 may prevent roll-back of materials being carried by belt 200.

Figure 5:
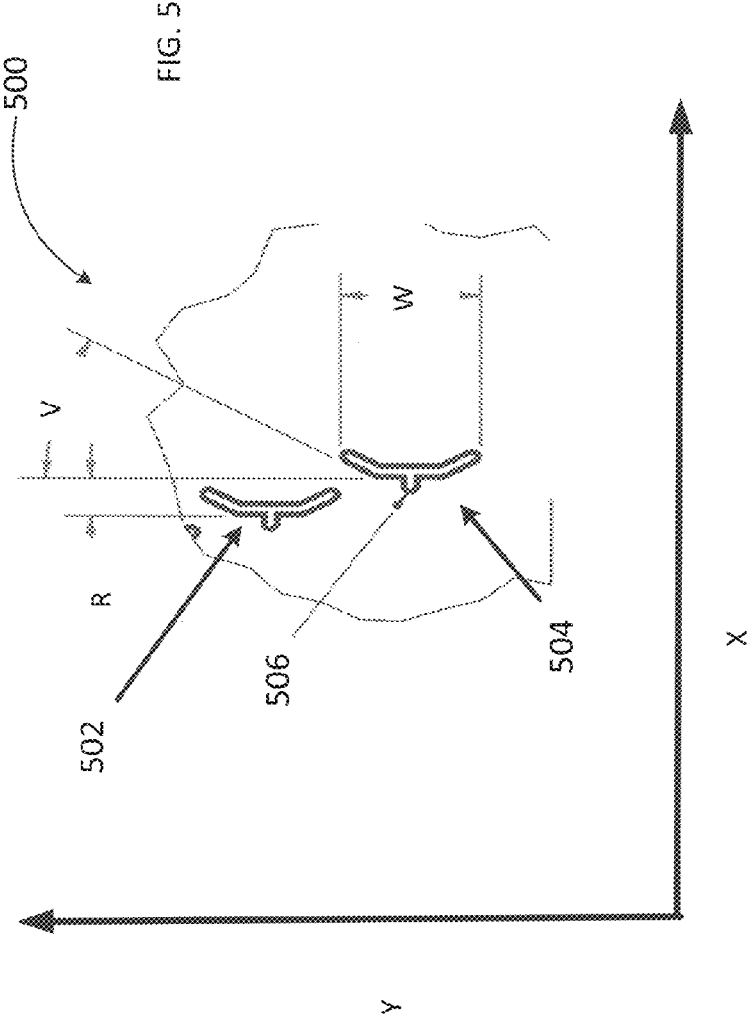
FIG. 5 is an example view of a portion of a conveyer belt in accordance with aspects of the present invention.

FIG. 5 is an example view of a portion 500 of belt 200 in accordance with aspects of the present invention. FIG. 5 described cleat 502 and cleat 504 which may be a part of cleat configuration 202, as described in FIGS. 2-4. As shown in FIG. 5, cleat 502 and cleat 504 are uniquely configured in accordance with the present invention to reduce and/or eliminate roll-back of materials being conveyed on belt 200 within a conveyer system, such as conveyer 100 described in FIG. 1.

As shown in FIG. 5, the shape of cleat 502 and cleat 504 includes a curvature that is set at a particular angle, "V." The particular angle "V" can be of any suitable value, such as within a range of about 20-40° degrees, e.g., about 30° degrees. Furthermore, the length of cleat 502 and cleat 504 may be of a particular length, "W." Length "W" can be any suitable length, such as within a range of about 1-3 inches, e.g., about 2 inches.

Additionally, both cleat 502 and cleat 504 have a reinforcing rib 506. As shown, reinforcing rib 506 extends outwards from cleat 502 and cleat 504 at a particular length (e.g., about 0.1-0.5 inches). Since cleat 502 and 504 are offset from each other, the tip of reinforcing rib 506 that protrudes outwards in such a manner that the tip of cleat 504 is on the same "X" level as the end points of cleat 502 as shown by comparing cleats 502 and 504 on a X-Y chart, as described in FIG. 5. Furthermore, each part of each cleat is of a particular distance from the same part of another cleat. For example, as shown in FIG. 5, the reinforcing rib of cleat 502 is distance "R" from the reinforcing rib of cleat 504. Distance "R" may range from about ½-1 inches, e.g., about 0.65 inches.

Figure 6B:
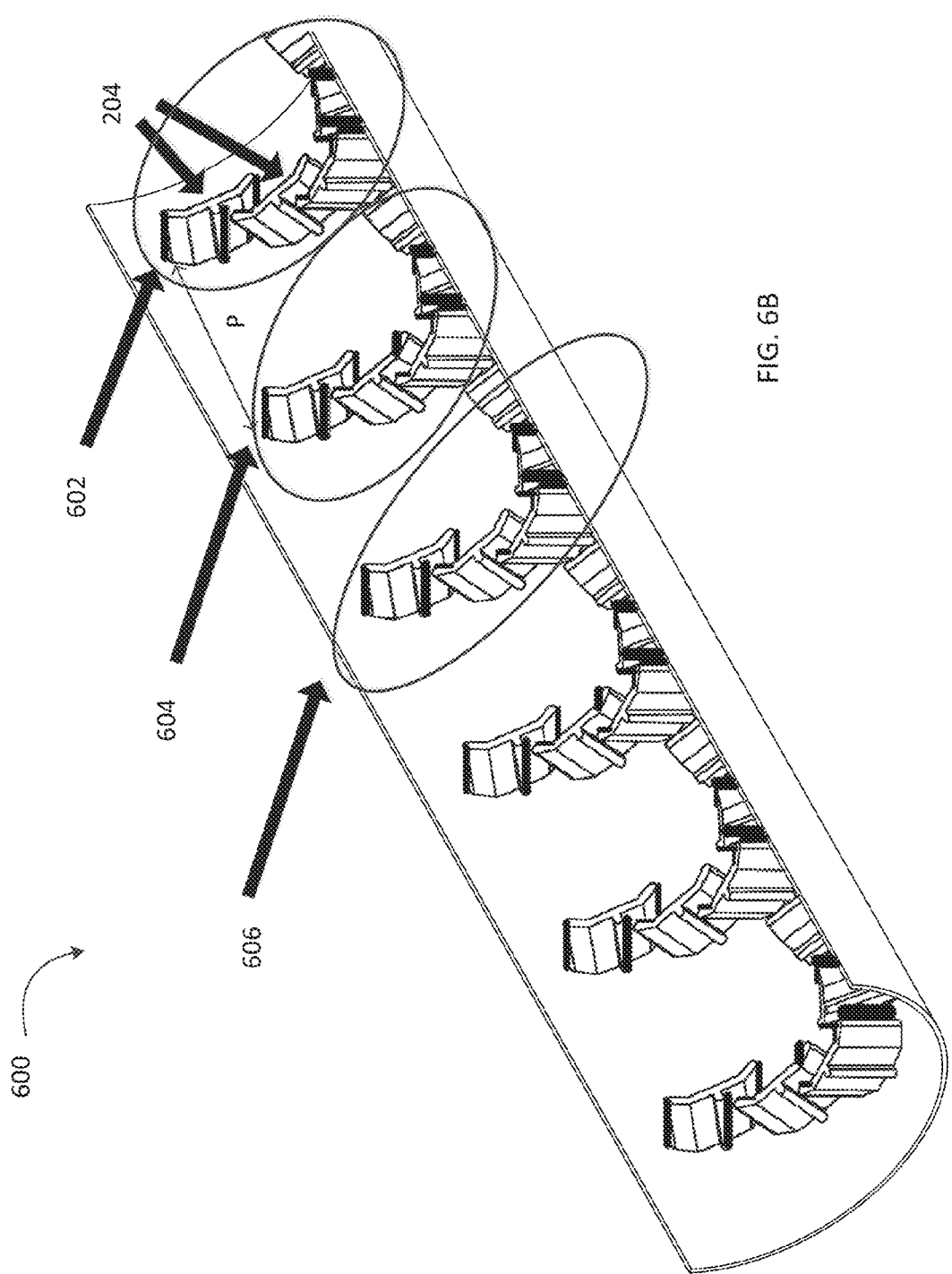

FIGS. 6A-6D are example views of cleats in a tubular shaped belt 600 in accordance with aspects of the present invention. As shown in FIGS. 6A-6D, tubular shaped belt 600 can include cleat configurations, such as cleat configurations 602 and 604 that include multiple cleats 204 as described in FIGS. 2-5. FIG. 6A shows how each cleat 204 within both cleat configurations 602 and 604 relate to each other. In particular, each cleat 204 is offset against other cleats 204 within cleat configurations 602 and 604. FIG. 6B shows an example perspective view of tubular shaped belt 600 with cleat configurations, such as cleat configurations 602, 604, and 606. As shown in FIG. 6B, cleat configuration 602 is at a particular distance "P" from cleat configuration 604. In embodiments, the particular distance "P" can be any measurement value, such as millimeters, inches, centimeters, etc. In embodiments, the distance between cleat configurations 602 and 604 may be the same as the distance between cleat configurations 604 and 606. In alternate embodiments, the distance between cleat configurations 602 and 604 may be a different distance than the distance between cleat configurations 604 and 606.

FIG. 6C shows a sectional side view 610 of tubular shaped belt 600 in accordance with aspects of the present invention. As shown in FIG. 6C, cleats 204, as they follow the curvature of tubular shaped belt 600, are offset to each other so that the sectional side view allows for a portion of one cleat 204 to be hidden behind another cleat 204. FIG. 6D shows an example transverse sectional view 612 of tubular shaped belt 600 taken along lines A-A. As shown in FIG. 6D, cleat configuration 602 shows how each cleat 204 is offset so that all the cleats are visible (either completely or partially) in the transverse sectional view.

FIGS. 7A-7C show example perspective views of tubular shaped belt 600 with cleat configurations, such as cleat configurations 602 and 604. FIGS. 7A-7C further provide a description of example cleat configurations within a belt used to convey materials and to prevent roll-back of the materials during the conveyance process.

Figure 8A:
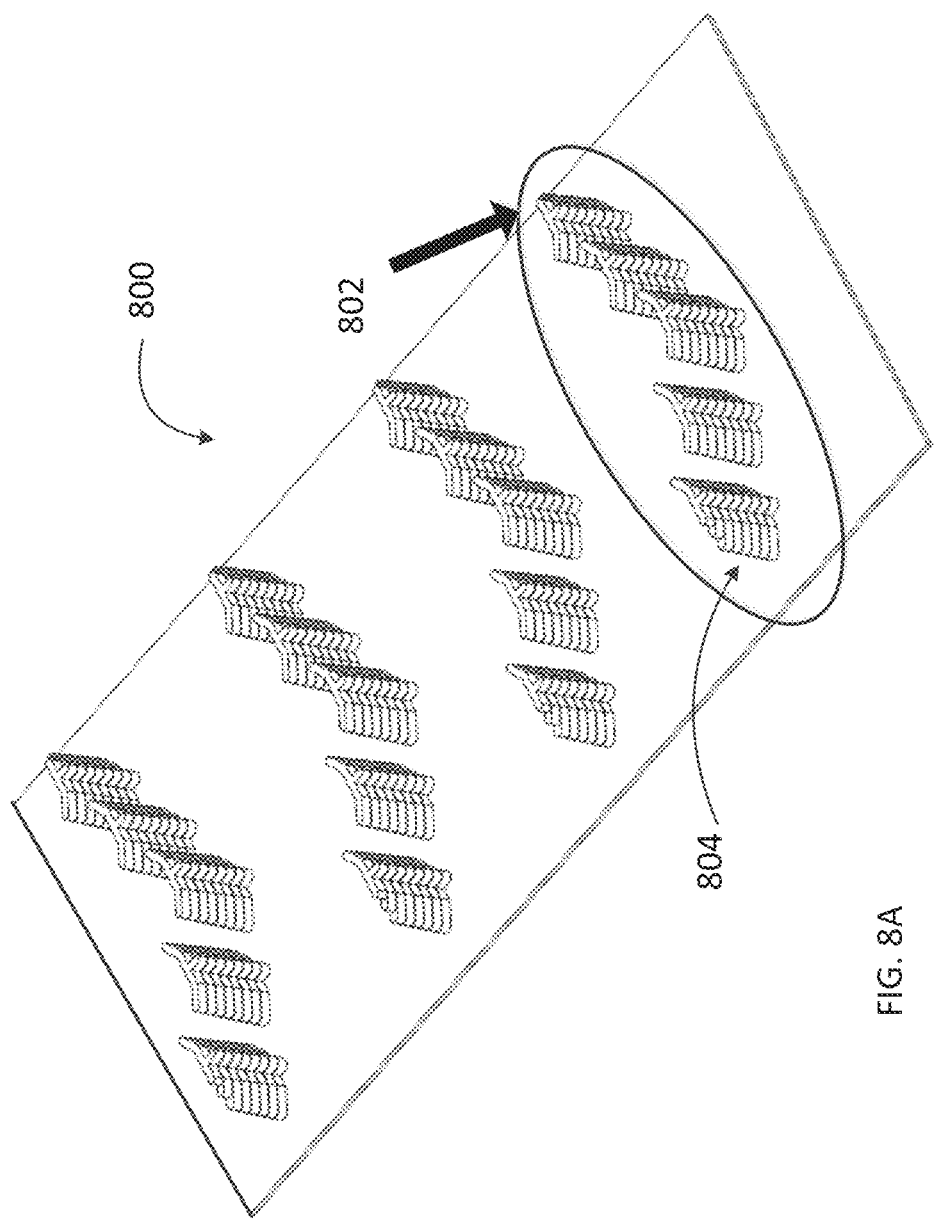
FIGS. 8A-8D are example views of a conveyer belt in accordance with aspects of the present invention.

FIGS. 8A-8D show example views of tubular shaped belt 800 with chamfered cleats. In particular, FIG. 8A shows a perspective view of tubular shaped belt 800 with a number of cleat configurations, such as cleat configuration 802. In embodiments, cleat configuration 802 is similar to cleat configuration 602 and 604, as described in FIGS. 6A-6B and 7A-7C, except the cleats, such as cleat 804, located on one or both ends of each cleat configuration have chamfered edges. As shown in FIG. 8A, the outer edges of cleat 804, that is closest to the sides of the belt 800, are chamfered so that the top portion of cleat 804 is smaller in length than the next portion of cleat 804, located below. As a result of the chamfered edges, the tubular shaped belt 800 is further improved with a greater amount of clearance between the cleat configurations and the edges of the belt. In embodiments, the cleats that are not located on the ends of cleat configuration 802 may or may not be chamfered. In embodiments, each cleat 804 and/or the cleats not located on the ends of cleat configuration 802 may have one side or both sides chamfered. While FIG. 8A shows that each cleat configuration, such as cleat configuration 804, has chamfered cleats, there can be a cleat configuration with no chamfered cleats located on belt 800 and another cleat configuration that has one or more chamfered cleats, also located on belt 800.

Figure 8B:
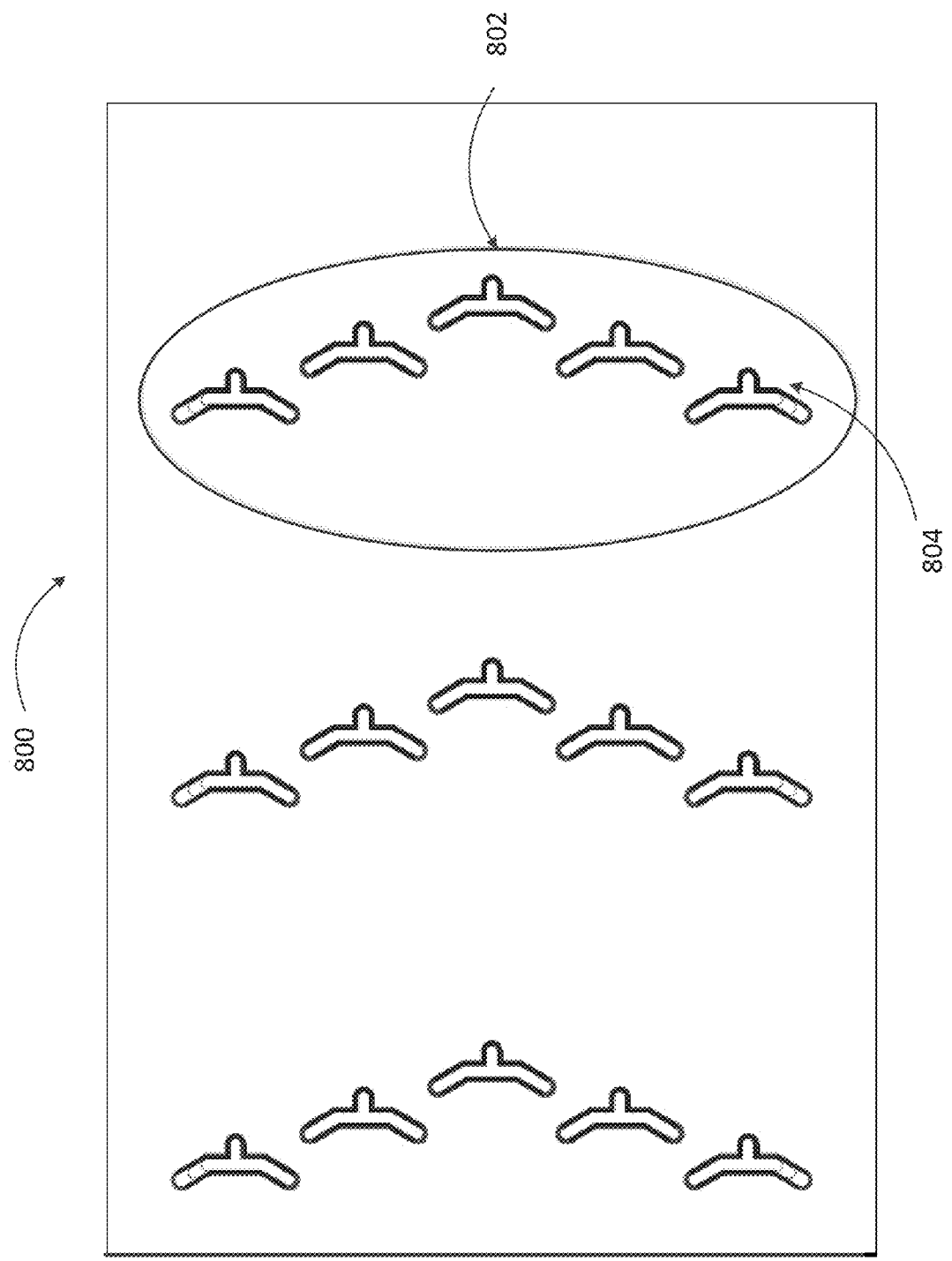
Figure 8C:
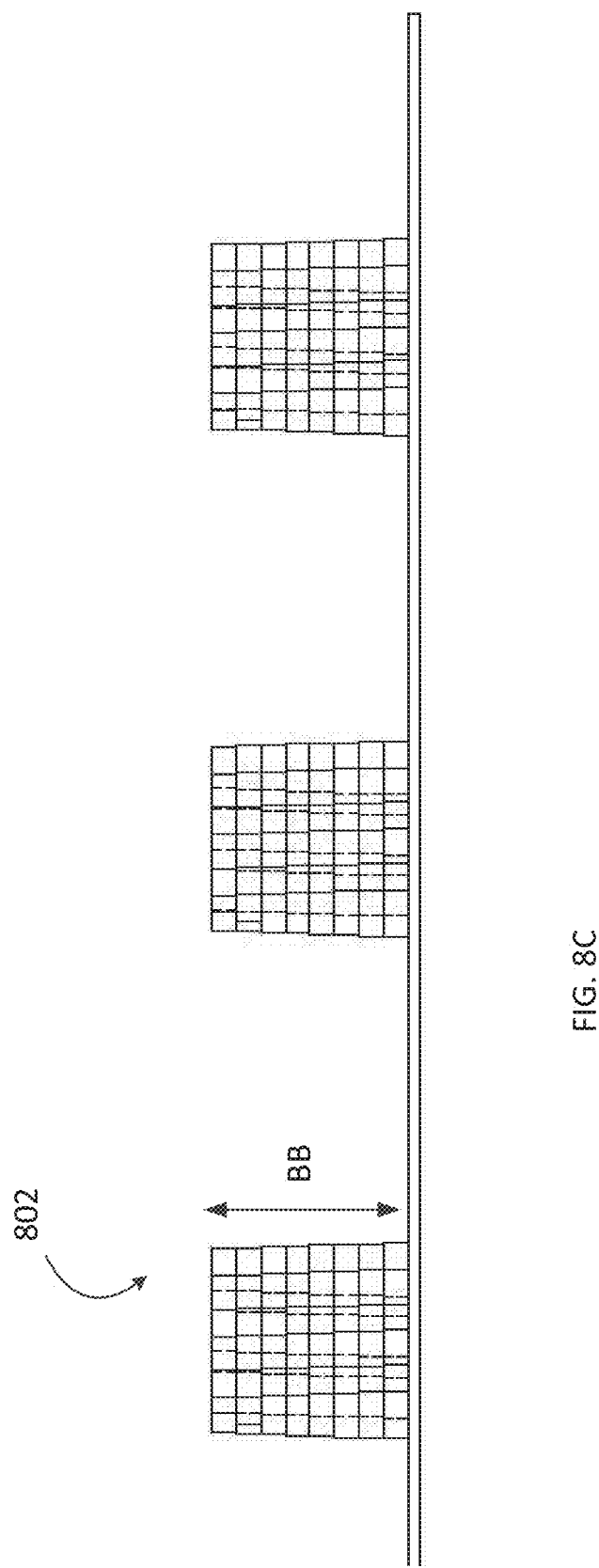
Figure 8D:
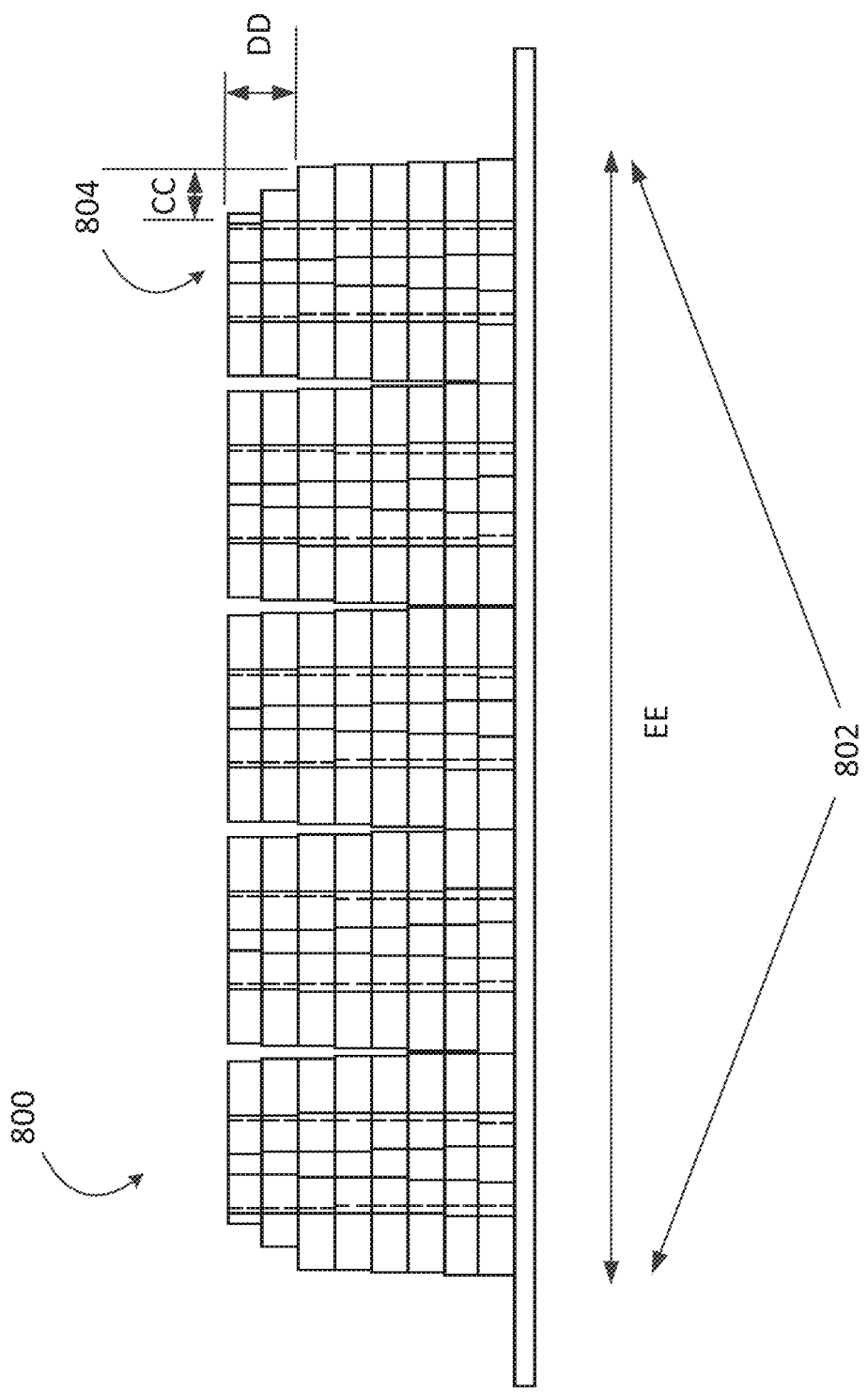

FIG. 8B shows an example plan view of tubular shaped belt 800 with cleat configurations 802 and cleat 804 in accordance with aspects of the present invention. FIG. 8C shows an example view of tubular shaped belt 800 in accordance with aspects of the present invention. In embodiments, the distance "BB," the height of one or more cleats 804, may range from 1-3 inches, e.g., about 2 inches. FIG. 8D shows an example view of a cleat configuration 802 in accordance with aspects of the present invention. In embodiments, the distance "CC," the distance from the end of the top chamfered row of a cleat to the end of the first non-chamfered row of the same cleat, may range from 0.25-0.65 inches, e.g., about 0.5 inches. In embodiments, the distance "DD," the height from the top chamfered row of the cleat 804 to the first non-chamfered row of the same cleat 804, may range from 0.25-0.65 inches, e.g., about 0.5 inches. In embodiments, the distance "EE," the length of a cleat configuration 802, may range from 8 to 16 inches, e.g., about 12 inches.

What is claimed is:

1. A conveyor system for conveying agricultural material, the conveyor system comprising:
   a conveyor housing;
   a conveyor disposed within the conveyor housing, the conveyor including a conveyor intake at one end and a conveyor discharge at another end; and
   a belt coupled to the conveyor and having a direction of travel, the belt including:
      a first pattern of cleats arranged transversely to the direction of travel of the belt; and
      a second pattern of cleats arranged transversely to the direction of travel of the belt and offset and separated from the first pattern along the direction of travel of the belt,
   wherein:
      the first pattern of cleats includes a first plurality of cleats arranged in a U-shape along a surface of the belt in a flat position such that adjacent cleats within the first pattern of cleats are offset from each other along the direction of travel of the belt; and
      the second pattern of cleats includes a second plurality of cleats arranged in a U-shape along the surface of the belt in a flat position such that adjacent cleats within the second pattern of cleats are offset from each other along the direction of travel of the belt.

2. The conveyor system of claim 1, wherein each cleat from at least one of the first plurality of cleats and the second plurality of cleats are offset from each adjacent cleat such that the belt can trough into a tubular shape without the cleats intersecting each other.

3. The conveyor system of claim 1, wherein at least one cleat from at least one of the first plurality of cleats and the second plurality of cleats is U-shaped.

4. The conveyor system of claim 1, wherein at least one cleat from at least one of the first plurality of cleats and the second plurality of cleats includes a reinforcing rib.

5. The conveyor system of claim 1, wherein at least one cleat from at least one of the first plurality of cleats and the second plurality of cleats is integrally attached to the belt.

6. The conveyor system of claim 5, wherein the at least one cleat from at least one of the first plurality of cleats and the second plurality of cleats that is integrally attached to the belt is attached by one of molding, bonding, welding, and soldering.

7. The conveyor system of claim 5, wherein at least one of the first plurality of cleats and the second plurality of cleats is integrally attached to the belt, with each cleat being attached individually.

8. The conveyor system of claim 5, wherein at least one of the first plurality of cleats and the second plurality of cleats is integrally attached to the belt, with the first or second plurality of cleats being attached as a group.

9. The conveyor system of claim 1, wherein each cleat from the first plurality of cleats is aligned along the direction of travel with a corresponding cleat from the second plurality of cleats.

10. The conveyor system of claim 1, wherein a minimum distance along the direction of travel between the first pattern of cleats and the second pattern of cleats is at least half a maximum distance along the direction of travel between any two cleats from one of the first pattern of cleats and the second pattern of cleats.

11. The conveyor system of claim 1, wherein a minimum distance along the direction of travel between the first pattern of cleats and the second pattern of cleats is at least a maximum distance along the direction of travel between any two cleats from one of the first pattern of cleats and the second pattern of cleats.

12. The conveyor system of claim 1, wherein a minimum distance along the direction of travel between the first pattern of cleats and the second pattern of cleats is at least one and a half a maximum distance along the direction of travel between any two cleats from one of the first pattern of cleats and the second pattern of cleats.

13. The conveyor system of claim 1, wherein at least one cleat from at least one of the first plurality of cleats and the second plurality of cleats is chamfered.

14. The conveyor system of claim 13, wherein the chamfered cleat is located at a transverse end of the first or second pattern of cleats.

* * * * *